UNITED STATES PATENT OFFICE.

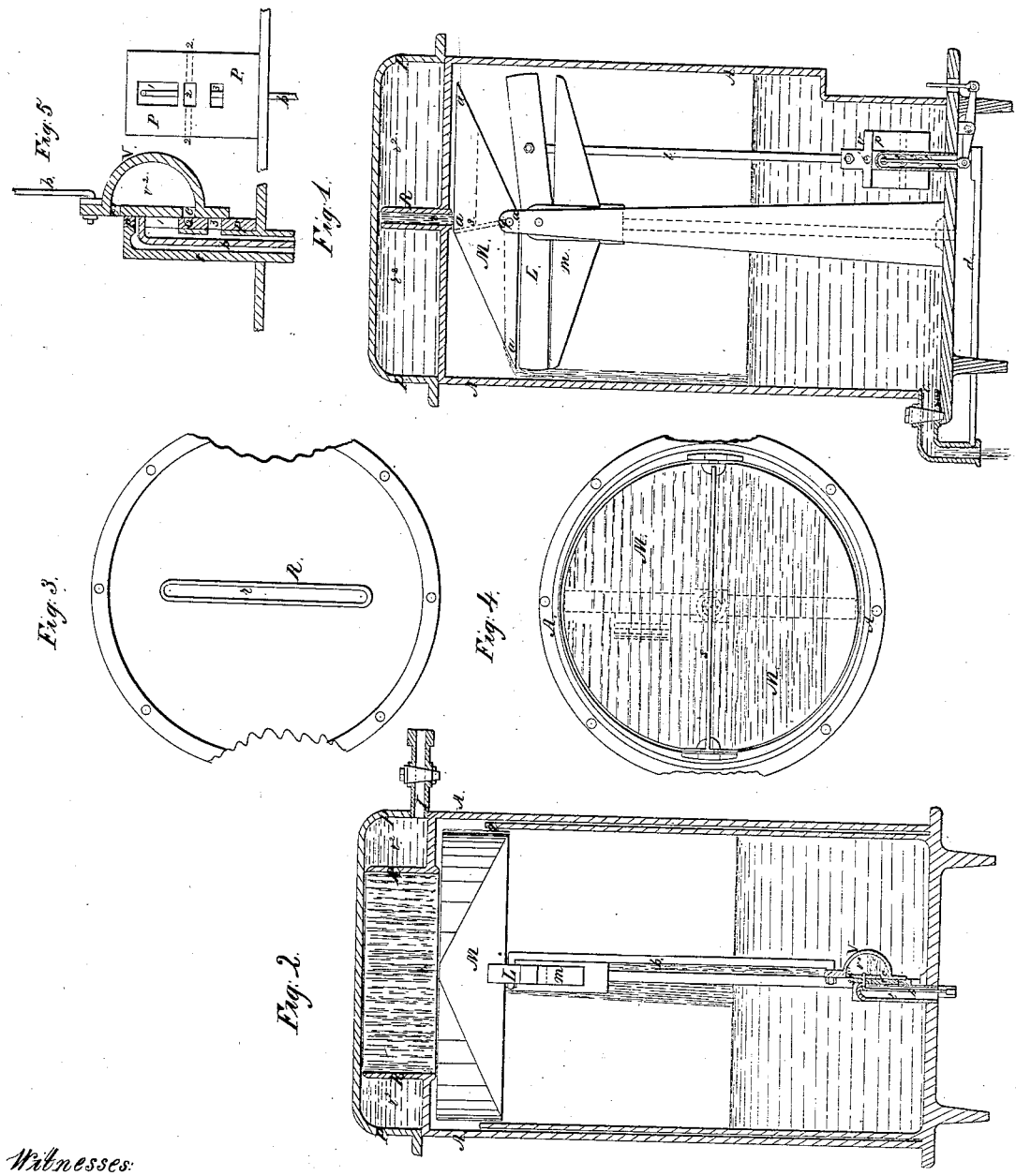

JAMES COCHRANE, OF NEW YORK, N. Y.

FLUID-METER.

Specification of Letters Patent No. 16,945, dated March 31, 1857.

*To all whom it may concern:*

Be it known that I, JAMES COCHRANE, of the city, county, and State of New York, have invented certain new and useful improvements in apparatus for measuring the quantity of liquids discharged through pipes without affecting the head or pressure thereof and without the use of pistons either reciprocating or rotary or any of the equivalents thereof, and that the following specification, taken in connection with the drawings, is a full, clear, and exact description thereof.

In the drawings, Figures 1 and 2 are elevations partly in section of the whole apparatus taken at right angles to each other. Fig. 3 is a top view of the main or primary vessel the upper or secondary vessel being removed. Fig. 4 is a top view of the parts below the top of the primary vessel, and Fig. 5 is a section on a large scale through the valve.

Prior to the date of my invention it has been proposed to construct meters for measuring liquids under a head or pressure by inclosing within an air tight vessel, provided with proper entrance and discharge orifices, a tilting measuring vessel which with its inclosing vessel is constructed, arranged and acts to measure water substantially in the manner hereinafter specified, and I have described it for the purpose of clearly indicating my improvements thereon. In the use of meters constructed under these general principles, two difficulties are experienced. First that arising from the water or other fluid falling with rapidity and violence into the measuring vessel proper, thereby spattering the water and permitting it to pass off without being measured at all, and second that which follows from the water as it descends in a thin sheet taking up air and carrying it out mechanically mixed with the water, so that in the course of time the water within the air tight vessel rises as high as the measuring vessel proper or higher. In this event the water ceases to be measured and flows through the meter without showing any indications upon the counter or register. Now I do not know that such a meter as I state has been proposed has ever been constructed except by myself, but in such a meter I have found these difficulties, the latter amounting to a vital objection to exist and the object of my invention is to remedy or entirely obviate them, thereby utilizing an apparatus whose general principles I deem superior to all that class of meters provided with pistons or diaphragms, working in cylinders or their equivalents and to this end the nature of the first part of my invention consists in combining a secondary air tight vessel, with an air tight vessel containing a tilting measuring apparatus or some equivalent therefor, by means of an orifice whose area is large in proportion to that of the entering or discharging orifices, substantially in the manner and for the purposes hereinafter specified. And the nature of the second part of my invention consists in combining, with an air tight vessel containing a measuring vessel, an apparatus substantially such as is hereinafter set forth, which shall from time to time introduce small quantities of the outer air into the interior of such an air tight vessel substantially in the manner and for the purpose hereinafter described.

In order to construct my apparatus I procure an air tight vessel of sufficient strength, and of any convenient form and suitable material but by preference metallic and cylindrical, provided with an aperture at the top for the admission of water and another at bottom in connection with proper cocks or a faucet for drawing it off. Within this vessel I support a proper measuring vessel which is in fact a scale beam with two pans of such interior configuration, that as the hollow of either of them fills with liquid, the position of its center of gravity advances toward the end of the beam. This vessel is located under the receiving orifice and is connected with an automatic apparatus for admitting air and also with such a counter or register as may be employed.

In the drawings is represented at A A a cylindrical air tight vessel, with a long narrow receiving aperture $r$ in its top, and a withdrawing orifice O at or near its bottom. Inside of this vessel is mounted upon proper piovts $q\ q$ a measuring vessel M composed in fact of two pans of triangular vertical section (see $a\ a\ a$) attached back to back. This vessel is free to vibrate a certain distance being governed by a stop $m$ and the points of junction or common back of the two pans $s$ is when vertical directly under the receiving aperture. Now by looking at this vessel as seen in Fig. 1, it will be perceived that when tilted to one side it is held there by the weight of one pan, a portion of the other and the back lying on one side of the pivots, while there is to counterbalance this weight on the other side only a portion of one pan; and it will be further observed that when fluid is admitted into the highest pan, the center of gravity of the contained fluid will as the quantity increases advance in the line of the arrow, until the effective weight on that side of the pivot will be greatest; then the pan will tilt dropping the water it contained and in so doing the partition or back $s$ will vibrate over to the other side of the receiving orifice and water will now flow into that pan which is now highest but was lowest when the fluid began to be admitted. A similar filling of a pan; alteration of center of gravity; tilting and dropping of water will then take place, and the pans will continue to oscillate dropping a quantity of water each time they are tilted, so long as liquid enters through the receiving orifice.

Between the pans and the stop $m$ is pivoted a vibrating beam L and as the pans tilt they vibrate this beam forcing one end or the other down upon the stop and holding it there during the time it takes a pan to fill. To one end of this beam is connected a rod $l$ which actuates a valve hereafter described. A tube R of oblong section extends upward for some distance above the aperture $r$, it is open at the top and is inclosed within a secondary air tight vessel P P into whose cavity $r^2$ the fluid to be measured is admitted, through the opening I which is in connection with some reservoir by what is usually termed a service pipe. To the end $l$ is attached a valve V having a cavity $v''$. This is like the cup of a slide valve and is in connection with two orifices $c$ $c'$ through its face, which rests upon a seat $p$ attached to the bottom of the air tight vessel. This seat has three openings 1, 2, and 3 through it. Openings 1 and 3 pass directly through the seat and communicate with the bore of a tube $t$ attached to the back of the seat, while opening 2 enters into the seat a short distance from the valve side and then bends off at right angles through the seat opening out in the edge thereof (see round hole in Figs. 2 and 5). This opening therefore at times makes a communication between the valve cavity and the interior of vessel A through $c$, and in the position the parts occupy in the drawings this communication is represented as made.

The tube $t$ is closed at its upper end, passes through the bottom of vessel A and is open at its lower end. In it is situated a small rod $b$ bent at its upper end and passing through opening 1 into the valve face where it is firmly attached. The lower end of this rod is pivoted to a small lever. which is to be connected with a proper counter or register not shown on the drawings.

The apparatus constructed substantially as above described is set up in some convenient spot and the orifice I connected by a pipe with a reservoir of liquid, while the orifice O may be connected with a series of pipes and faucets or be governed by a single cock or valve. Liquid is now permitted to flow into the receiving or secondary chamber through I, as it enters it will compress the air contained in both vessels and rise above the top of R flowing down through it into one or other of the tilting pans, which when full to a certain extent will tilt dropping its contained water into the bottom of the large vessel A, the other pan will then be presented and filled, and the tilting and dropping will continue until the air contained in the two vessels is compressed to the amount due to the head of the entering water; as soon as this happens water will cease to enter. Now by virtue of the connection through the rod $l$, the valve and the rod $b$ the counter will move at each vibration of the measuring vessel, thus registering the number of oscillations and if the capacity of the pans be known, the quantity of fluid which has passed out of the reservoir through $r$. The little valve V will also move stroke for stroke with the pans, resting during the time it takes to fill a pan. When this valve is in the position shown in the drawings, water when in the bottom of the vessel, will enter through $c'$, and through orifice 2 in the seat and thence through $c$ into the cavity of the valve displacing the air contained therein, which will thus be forced into the air tight vessel; but when the valve descends, sliding on its seat, opening $c'$ in its face will be opposite opening 1 in the seat and opening $c$ in the face will be opposite opening 3 in the seat. The valve cavity will thus be in connection through the tube, with the outer air, which will enter the upper as the water drops out through the lower hole; the valve cavity will thus fill wholly or partially with air, and when the valve returns to the position shown in the drawings, this air will be displaced by water, and find its way into the air tight vessel. These effects will be repeated at each movement of the valve, thus discharging a small quantity of water and introducing a like quantity of air at each stroke.

It will be observed that no water or air will be lost through the opening 1 except that which is intentionally discharged from the valve cavity, as the valve face covers this aperture at all times except when $c'$ is opposite to it, and then the tube is in communication with the valve cavity only and not with the interior of the vessel A. Now supposing the vessel to be thus filled partially with air and partially with liquid and any faucet in connection with o be opened; then liquid will be forced out by the pressure of the contained air, whose density will diminish and water will be forced in by the head due to the height of the reservoir, passing over the top of R and actuating the tilting vessel's valve and register. If the pressure in the entering pipe should increase, water will enter the upper vessel, be measured and fall until the pressure of the confined air is equal to that due to the head of the entering water, and this action will take place whether the discharge orifice be shut or open. If on the contrary the head on the entering pipe should diminish, water will be driven out of the secondary vessel back into the entering pipe until an equilibrium be again established; or a check valve closing toward the reservoir may be placed in the entering pipe to prevent such action in which case no water will enter the air tight vessels until water has been discharged through o in such quantity as will permit the contained air to expand down to or a little below the pressure due to the head of water in the entering pipe.

If it should so happen that both vessels or even the lower vessel were entirely filled with liquid, then any quantity of liquid which might enter would pass through without being measured, and it is to prevent all risk of such a contingency that I devised the plan of admitting or introducing air at each vibration of the measuring vessel. I always intend thus to introduce more air than is absolutely necessary, as if there should be an excess of air it will discharge itself through the discharge orifice when open. Moreover water need not be wasted by the operation, as the portion discharged at each stroke of the valve may be conveyed by a pipe such as $d$ to any house cistern, where water is wanted under no head, such as water-closet cisterns.

The orifice $r$ is made narrow in order that the partition $s$ may pass under it quickly, and its area is large in proportion to that of the receiving opening, so that water may pass through it at a low velocity thus avoiding spattering when it enters either pan, and the consequent falling of water without being measured. It will further be observed that this effect will take place even if the long narrow tube did not rise from the orifice but by the use of this tube I force the entering liquid to rise gradually and flow over the whole circumference of the tube in a current whose depth and velocity is equal or nearly so in its different sections, and I moreover in this manner constitute the upper vessel a reservoir of water, which in case of any decrease of pressure will be forced back into the service pipes while the expanding air will take its place in the secondary air tight vessel. If this rising tube were not used the air itself would in case of the decrease of pressure, be forced back into the service pipes, and if caught in the bends it might not return to the meter when the pressure was again increased, and in such event the regular action of the meter would be interfered with and an erroneous measurement might be recorded.

A small quantity of water will always fall into each pan after it has begun to tilt and before that pan is arrested by the stop, for the reason that the partition $s$ cannot pass instantaneously under the opening $r$. This is a matter of no importance in practice as I intend to gage the instruments by actually measuring the amounts of water discharged at the lower orifice during a given number of vibrations of the measuring vessel.

The upper vessel is a useful adjunct to the apparatus but is not absolutely essential as it is clear that a very fair result may be produced by connecting the reservoir directly with the pipe R. The size of the primary air tight vessel as considered with reference to the capacity of the pans depends upon the greatest amount of head in any special locality; it ought to be so large that the water when entering for the first time, shall not compress the air to such an extent as will permit the water to rise to the bottom of the measuring pans.

Now I do not intend to confine myself to the precise method of construction herein described as that may be modified greatly while the apparatus remains substantially the same. For instance an overshot or breast wheel provided with a proper intermittent retarder may be substituted for the pans, and the pans may have any proper stop in lieu of that described, and the connection between the pans and counter may be made in a variety of ways, this connection may pass through a stuffing box or its equivalent to the counter or the latter may be placed within the vessel. There are also a great variety of contrivances known to me as substitutes for the apparatus specially described as the introducer of air, such as cocks, or small pumps whose suction connects with the atmosphere and whose discharge leads into the air vessel, all of which are mere equivalents of the valve herein described provided they are so fitted and moved automatically as to produce the effect of introducing air from time to time. Moreover the shape and arrangement of the various parts may be altered in various ways and the same effect be produced by substantially the same combination of parts.

Having thus described my apparatus for measuring the volume of liquid discharged under a head from an orifice or orifices I claim therein as new and of my own invention

1. In combination with a tilting measuring vessel or its equivalent inclosed within an air tight vessel, a secondary air tight vessel connected with the former substantially in the manner and for the purposes herein described.

2. I claim combining with a measuring vessel located in and combined with an air chamber, an apparatus substantially such as is herein described which shall from time to time introduce portions of the outer air into the interior of the air chamber, the whole being and operating substantially in the manner and for the purposes hereinbefore specified.

In witness whereof I have hereunto subscribed my name in the city of New York on this third day of February A. D. 1857.

JAMES COCHRANE.

In presence of—
 EDWARD H. LENT,
 JAMES COCHRANE, Jr.,
 WM. H. STANSBURY.